July 23, 1963
L. C. SIMMONS
3,098,562
LOADING SYSTEM APPARATUS
Filed March 21, 1960
3 Sheets-Sheet 1
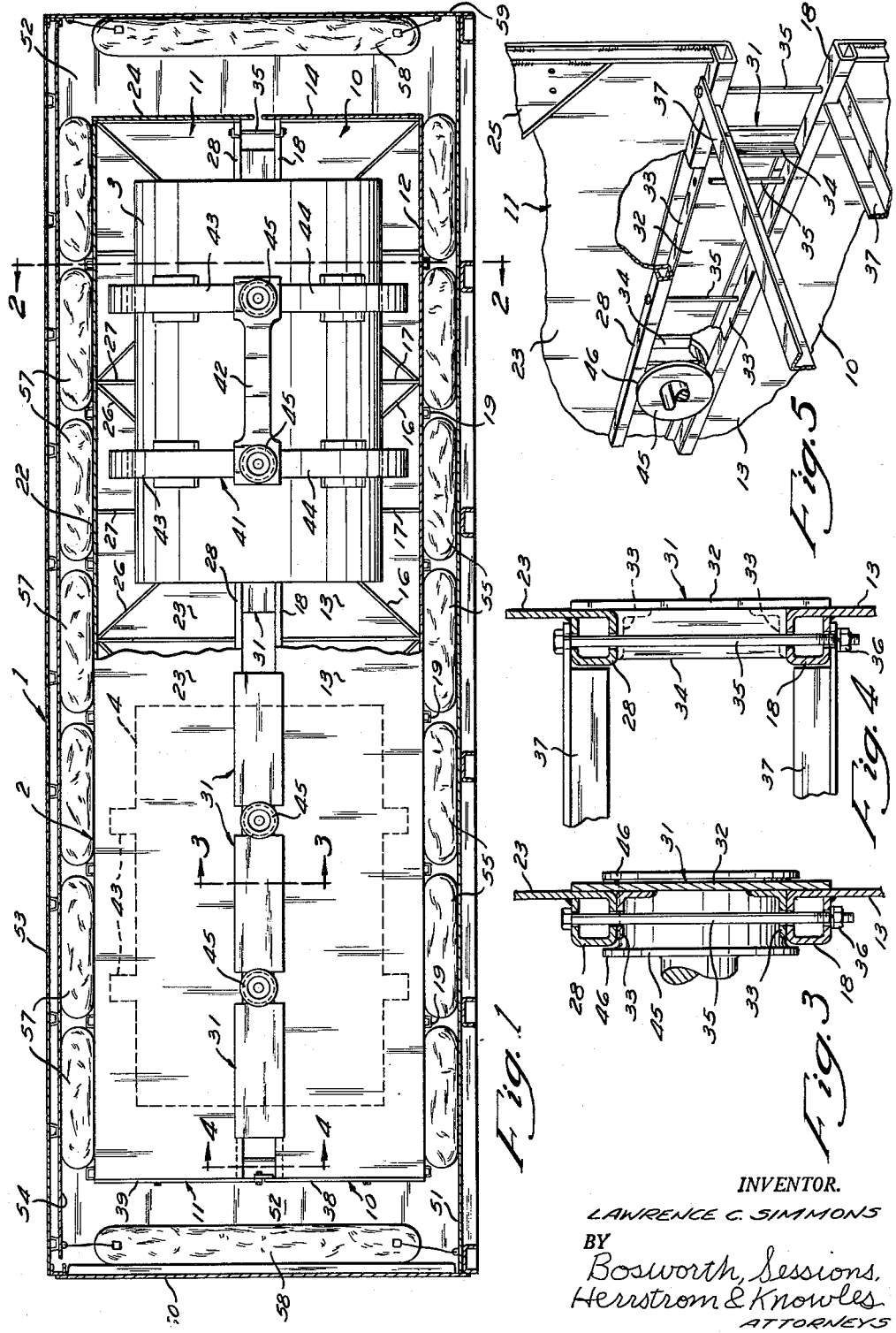
INVENTOR.
LAWRENCE C. SIMMONS
BY
Bosworth, Sessions,
Herrstrom & Knowles
ATTORNEYS

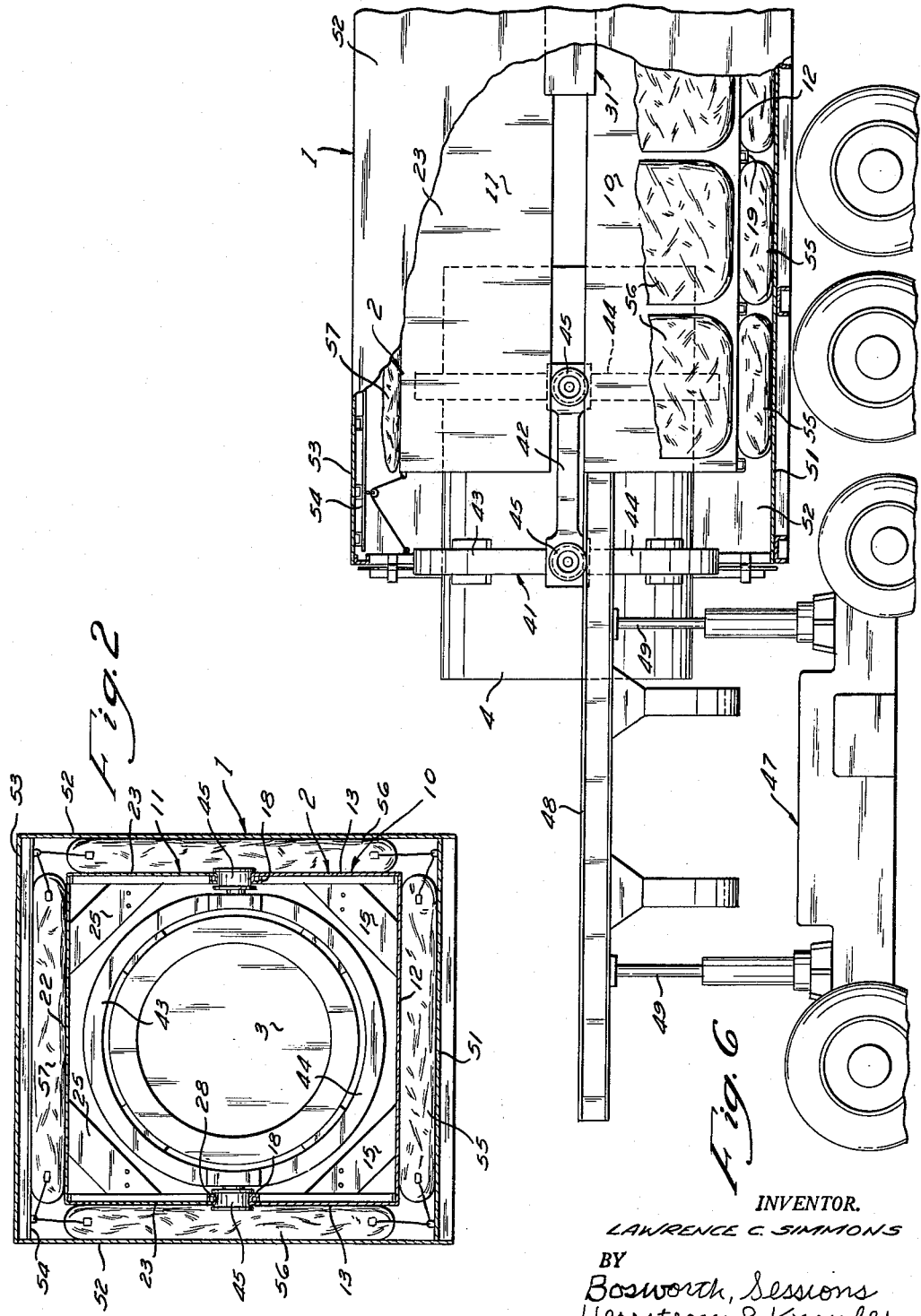

July 23, 1963     L. C. SIMMONS     3,098,562
LOADING SYSTEM APPARATUS
Filed March 21, 1960     3 Sheets-Sheet 3
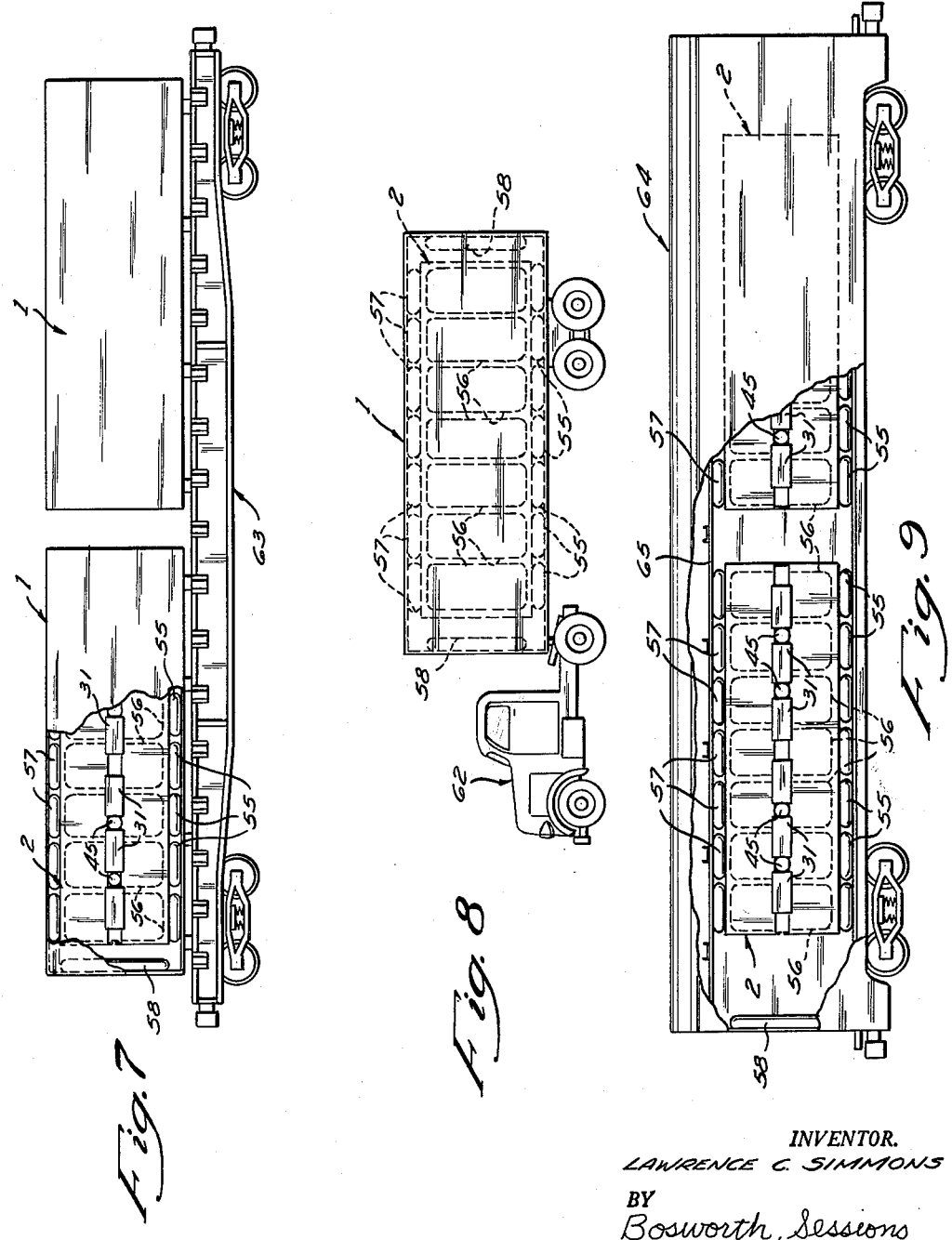
INVENTOR.
LAWRENCE C. SIMMONS
BY
Bosworth, Sessions
Herrstrom & Knowles
ATTORNEYS

United States Patent Office 3,098,562
Patented July 23, 1963

3,098,562
LOADING SYSTEM APPARATUS
Lawrence C. Simmons, Cleveland, Ohio, assignor to Cleveland Technical Center, Inc., Cleveland, Ohio, a corporation of Delaware
Filed Mar. 21, 1960, Ser. No. 16,444
3 Claims. (Cl. 206—46)

This invention relates to loading systems and apparatus for use in such systems, and more particularly to loading systems which are adapted to protect articles from damaging shocks during transportation.

While the invention may be used to advantage in the transportation of a wide variety of articles, it provides particular advantages in the transportation of bulky articles of irregular shape and substantial weight, which are difficult to support and which therefore provide problems in loading, unloading and shipping; examples of such articles are engines for aircraft, space vehicles, ground vehicles, or the like. It is important that once such costly engines have been completed and adjusted, they be handled and transported so that they arrive at their destinations undamaged and requiring little or no adjustment. It is frequently necessary to transport such engines for long distances; often at least part of the journey must be made by ground vehicle such as truck trailer over roads which may be rough. In transportation by rail, truck or other vehicles, it is impossible to avoid shocks to the vehicle on starting or stopping which may result from accelerations or decelerations of as much as 20 $g$'s (where "$g$" is the acceleration of gravity or about 32.2 feet per second); or to avoid vibrations which can impart to the vehicle in transit shock magnitudes of as high as 5 $g$'s and shock frequencies of as high as 30 to 100 cycles per second. Therefore, a loading system must be employed that will protect the engine against severe shocks to the vehicle. It also is highly desirable that such loading system be of a standardized, flexible type which lends itself to the transportation of such engines by either trucks, railcars or other vehicles, without substantial additional handling of the engines. It is also desirable that the truck or railcar equipment used be of standard commercially available types which require little if any modification; use of such vehicles makes it possible to eliminate extra costs and delays in waiting for arrival of specialized equipment or for equipment modification, and to enable the release at destination of the equipment for other commercial purposes.

The loading system preferably should include a truck trailer van in which the article to be shipped can be loaded and which can be hauled directly to the destination on a short trip; or which can be hauled by truck to a railroad car on which the van can be loaded for a long trip and from which it can be unloaded at the point of car destination and hauled by truck to the ultimate destination. It is also preferable that the loading system be such that the article can be loaded into the van at the shipping point and unloaded at the ultimate destination without intermediate handling or unloading of the article, to minimize the possibilities of damage or harm to the article. Furthermore, it is desirable that the loading system be such that the article can be loaded into and unloaded from a truck van with simple apparatus, preferably that which is used in transporting the article along the ground. Preferably, the loading system should be such that the article can be easily loaded into and unloaded from a closed truck van; that is desirable because the article can thus be protected during transportation from moisture, dust or dirt, humidity or temperature changes, or other deleterious conditions.

An object of the present invention is the provision of a loading system which can satisfy all of the desiderata set forth above. Another object is to provide a loading system which is effective to protect loads against shocks of substantial magnitude in any direction, and particularly in the direction of travel in which the shocks are usually greatest. A further object is to provide such a loading system which may be readily installed in existing truck vans, railroad cars, or other conveyances of standard types with little, if any, modification of the conveyance so that at the end of the trip the conveyance may be released for general uses. A further object is the provision of such a loading system which is inexpensive, simple and easy to use and install. Another objective is the provision of a loading system embodying a rigid longitudinally extending container in which the article to be shipped is supported from the sides of the container and secured against appreciable movement relatively to the container in any direction, and which container is such that the article to be shipped may be easily moved into and out of the container during loading and unloading. A further object is the provision of a loading system embodying such a container having bottom and side surfaces of substantial area, in which loading system bags or similar enclosures inflated with air, gas or other suitable fluids support the container in the conveyance, and permit restrained longitudinal movement of the container supporting the article to be shipped through substantial distances relatively to the conveyance in response to shocks imparted to the conveyance in the direction of travel, thus reducing the rate of change of kinetic energy, and the acceleration or deceleration of the article to be shipped, to values where damage to the article is prevented, while also protecting the article against shocks imparted to the conveyance from other directions.

Further advantages, objects and a fuller understanding of my invention will become apparent from the following description of preferred forms thereof, reference being made to the accompanying drawings in which:

FIGURE 1 shows the body portion of a truck trailer van carrying two articles to be shipped, mounted in a longitudinally extending container supported from the trailer van by air bags in accordance with the present invention, the body of the trailer van being shown in section and other parts of the loading system being shown broken away for the purpose of illustration;

FIGURE 2 is a cross section of FIGURE 1 along line 2—2;

FIGURE 3 is a detail elevation along line 3—3 of FIGURE 1 but to a larger scale, showing a portion of the side of the container including the means for connecting together the upper and lower sections of the container and the spacer member which separates such upper and lower sections;

FIGURE 4 is a detail elevation along line 4—4 of FIGURE 1 and to the same scale as FIGURE 3, of a portion of a side wall of the container showing the upper and lower sections of the containers and transverse structural members connected to them;

FIGURE 5 is a detail perspective view, with parts broken away, showing elements of FIGURES 3 and 4;

FIGURE 6 illustrates the loading of an article into the container disposed in a trailer van;

FIGURE 7 is an elevation of a railroad car carrying two trailer van bodies containing loads carried according to the present invention;

FIGURE 8 is an elevation of a truck-drawn trailer van embodying a loading system of the present invention;

FIGURE 9 is an elevation of a baggage car containing two containers in which articles are mounted, the containers being supported by loading systems embodying the present invention.

In the loading system illustrated in FIGURE 1 to 6, inclusive, a closed trailer van body generally designated by reference numeral 1 carries a longitudinally extending container or auxiliary carrier 2 which encloses and supports two articles to be shipped, designated by numerals 3 and 4, which articles may be engines of one of the types previously mentioned. The container 2 comprises a lower section 10 and a upper section 11 which is normally mounted vertically above the lower section.

Lower section 10 preferably takes the general form of a parallelepiped as shown, having an open top and open rear end, comprising a bottom wall 12, two parallel upwardly extending side walls 13 and a front end wall 14. Preferably these walls are formed of sheet steel, side walls 13 being rigidly connected to bottom wall 12 by welding and by gussets 15 and the front wall 14 being similarly connected to bottom wall 12 and side walls 13 by welding and similar gussets. Suitable internal framing members 16 and 17 may be welded to strengthen the bottom, side and end walls. At their upper edges side walls 13 rigidly carry a pair of parallel longitudinally extending members 18 of substantial cross section, which serve to reinforce the side walls and also act as rails to support in guided rolling contact the rollers to be later described by which the articles 3 and 4 are moved into and out of the container. In the apparatus shown, the longitudinally extending reinforcing members 18 are formed by bending the edges of the sheet metal of the walls in the shape of a rectangular beam, as shown in FIGURES 3, 4 and 5, although these members may take the form of rolled sections welded or otherwise fastened to the upper edges of the side walls. The bottom surface of the bottom wall 12 and the outwardly facing surfaces of the side walls 13 are substantially smooth and flat throughout the length of the lower section 10, being interrupted only by widely spaced transversely extending reinforcing ribs 19 on the bottom surface.

The upper section 11 of the container 2 similarly takes the general form of a parallelepiped, having an opening bottom and rear end; it comprises a top wall 22, downwardly extending side walls 23, and a front end wall 24. The side walls and end wall are rigidly connected, as by welding, to the top wall and to each other, gussets 25 and internal stiffener ribs 26 and 27 being provided to add strength and stiffness to the structure. The lower edges of the side walls 23 rigidly carry longitudinally extending reinforcing members 28 of substantial cross section, which are similar to members 18.

When the container 2 is assembled and ready for transportation, the upper and lower sections 10 and 11 are rigidly connected together by spacer member 31. Each of these spacer members comprises a sheet metal side plate 32 having welded to it spaced longitudinally extending ribs 33 and transversely extending ribs 34 at its ends, ribs 33 and 34 being conveniently formed by welding angle sections to the plate. As shown in FIGURES 3, 4 and 5, the spacer members are securely mounted with their ribs 33 bearing against the longitudinally extending members 18 and 28 of the upper and lower sections 10 and 11 to space these sections apart vertically and by bolts 35 passing through ribs 33 longitudinally extending members 18 and 28, and tightened by nut 36. Certain of these bolts 35 also rigidly demountably connect transverse members 37 which extend across the container 2 either between the longitudinally extending members 18 or between longitudinally extending members 28 on opposite sides of the container, or to both sets of such members as shown in FIGURES 4 and 5. Such transverse members reinforce the longitudinally extending side walls 13 of lower section 10 and side walls 23 of upper section 11, to aid in maintaining their parallelism and prevent them from bowing inwardly or outwardly, under load, shock, or inflated bag pressure. A plurality of these transverse members 37 are employed, one or more being located at intervals lengthwise of the container 2. The open rear end of the container 2 is preferably closed, as by closure members 38 and 39 bolted to the end framing members of the lower and upper sections 10 and 11. The container 2, thus assembled, is a rigid, unitary structure.

As shown in FIGURES 1, 2 and 6, articles 3 and 4 being transported are rigidly supported in individual carriers 41 which are secured in container 2 against movement in any direction. Each of these carriers comprises two side members 42 rigidly connected together by upper and lower transverse members 43 and 44 which serve to support and secure the article being shipped. Each side member 42 also has rotatably mounted on it a pair of outwardly projecting flanged rollers 45. When the container 2 has the article being shipped supported in it ready for transportation, the rollers 45 are supported by the parallel longitudinally extending reinforcing members 18 of the bottom section 10 with their roller flanges 46 contacting the sides of the members 18, as shown in FIGURE 5. The rollers 45 are thus prevented from moving appreciably transversely relatively to the container 2; and since the rollers 45 and the article being shipped are incapable of appreciable movement transversely of the carrier 1, the article is thus secured against any appreciable movement transversely of container 2. Preferably, the spacer members 31 are so dimensioned that the longitudinally extending reinforcing members 28 at the lower side edges of the upper section 11 are sufficiently closely positioned to longitudinally extending members 18 of lower section 10 so that the sides of the members 28 also can contact the flanges 46 of the rollers 45 and the bottom edges of the members 28 closely clear the roller surfaces of the rollers 45; in this case the longitudinally extending reinforcing members 28 also aid in preventing appreciable transverse or vertical movement relatively to the container 2 of the rollers 45, the carrier 41 and the article mounted in it.

The container 2 of the invention makes it possible to easily load the articles 3 or 4 into the container. FIGURE 6 illustrates a preferred loading procedure in which the upper and lower sections 10 and 11 of the container 2 are located in the trailer van 1, certain of the spacer members 31 and transverse members 37 being removed for a distance such that the carriers 41 can move into the container 2 to the desired positions; the upper and lower sections 10 and 11 however, are supported to each other by the van in the same positions as if spacer members were installed. The carrier 41, supporting article 4 by transverse members 43 and 44, is rolled into position in the container 2 by guided rolling contact of the rollers 45 on the longitudinally extending reinforcing members 18 of the lower section 10. While various means may be used for introducing carrier 41 into the container 2 with its rollers 45 in proper position relative to reinforcing members 18, that shown comprises a power driven lift truck 47 having spaced parallel rails 48 adapted to support and guide the rollers 45. The rails 48 supporting the carrier 41 are supported by lifting rods 49 adapted to be vertically moved by suitable power means not shown forming part of truck 47. By proper movements of truck 47 and rods 49, the rails 48 may be brought into alignment with the ends of the longitudinally extending members 18 so that the rollers 45 of carrier 41 may travel from the rails 48 onto members 18, as shown in FIGURE 5. The carrier 41 may be moved manually or by power means, not shown. Similar means and methods may be used for unloading the carrier 41 supporting article 4 from the container 2.

After the articles 3 and 4 are loaded into the container, the spacer members 31, transverse members 37, and the rear closure members 38 and 39 are rigidly secured in place to form a rigid container 2 in which the articles to be shipped are supported and secured against appreciable movement in any direction relatively to the container 2. This container is supported in the van by means of impermeable bags or similar flexible enclosures inflated to a low pressure with air or other suitable fluid. The bags contact and frictionally engage the van and also the container at the bottom and sides, and if desired or necessary, at the top in such manner that the load is entirely carried by the bags while being capable of movement, restrained by the bags, relatively to the van in the direction of travel, which direction extends longitudinally of the van. The bottom bags provide vertical support to the container and protect the container and the articles in it from substantially vertically directed shocks. The side bags protect the container and the articles supported in it from transverse shocks; and the bottom and side bags, and the top bags if used, protect the container and the articles in it from shocks in the longitudinal direction. This protection is achieved since the bags are such that they permit the container supporting the articles to be shipped to move longitudinally with respect to the van for a substantial distance, through clear spaces at the ends of the container, against suitable restraining forces provided by the bags. Such movement against restraining forces acts to reduce the rate of acceleration or deceleration of the container and increases the time in which the kinetic energy of the container supporting the articles to be shipped is changed by being dissipated on stopping or by being increased on starting of the container. The container supporting the articles to be shipped is thus protected from substantially longitudinally directed shocks.

In the embodiment of the invention illustrated in FIGURES 1 to 6, inclusive, the van body 1 has substantially smooth interior surfaces on its bottom 51, side walls 52 and top 53. If necessary, auxiliary sheeting material, such as plywood sheets 54 shown at the top of the van body, may be installed over internal structural members on the van body to provide the desired smooth surfaces. The dimensions of the container 2 are such that substantial clearances are provided between the bottom, sides and top of the container 2 and the bottom, side, and top interior surfaces of the van body 1; preferable each of these clearances is about six inches. Furthermore, a substantial clear distance is provided between each end of the container 2 and the end of the van body; in the illustrated embodiment this clearance is about 30″, and provides sufficient room for the container to move longitudinally relative to the van body against the restraining forces of the air bags in the shock absorbing operation.

The container 2 is supported by seven air bags 55 between the bottom surface of the container and the floor 51 of the van body; seven air bags 56 between each side of the container 2 and the interior surface of the side wall 52 of the van body; and seven air bags 57 between the top of the container 2 and the interior surface, such as the sheet 54, of the top wall 53 of the van. The embodiment illustrated also includes two air bags 58 disposed adjacent the front and rear end walls 59 and 60 of the van but separated from the ends of the container 2 by a substantial distance; these air bags 58 are preferably provided as emergency buffers in the event that shocks more severe than that for which the system is designed should cause the container to travel longitudinally more than the calculated distance.

While the air bags may be of various types, those illustrated are commercially available air bags comprising an outer casing made of nylon or similar fabric and a synthetic rubber such as neoprene, containing a bladder of butyl or other suitable rubber designed for a 10 lb. per square inch maximum working pressure and a 28 lb. per square inch bursting pressure. Preferably each of these bags when uninflated has approximately the form of a rectangle and is about two feet thick when inflated to the range of pressures used and not under load; the width of the bag is substantially greater than its thickness when so inflated, being preferably at least three times as great as the thickness. In the illustrated embodiment, the supporting bags at the bottom of the load are preferably about 4′ wide and 6′ long and disposed with their longest dimension and thickness extending transversely of the container; the side bags are approximately 4′ wide and 5′ long, and disposed with their longest dimension and thickness extending transversely of the container; the top bags are nominally 4′ wide and 7′ long and are disposed with their longest dimension extending transversely of the container 2. While, as will be explained later, any one of various gases in a range of pressures may be used in the bags, in the illustrated embodiment the bottom bags are filled with air at a pressure of approximately 3 lbs. per square inch, and the side and top bags are filled with air at a pressure of approximately 1 lb. per square inch, all pressures of course being above atmospheric.

Preferably the lower and upper sections 10 and 11 of the container 2 are separately placed in the van body 1 by suitable means, such as rollers or sheaves, prior to placement of the articles to be shipped in the container 2 and prior to inflation of the air bags. The articles to be shipped may be loaded into the container 2 either before or after inflation of the bottom air bags; the top and side air bags cannot be inflated until after the container 2 has been assembled into a rigid unit.

After the van body has been thus loaded with the container 2 containing the articles to be shipped and is supported by the air bags, it may be moved over the road in the usual manner by a truck tractor 62 for any suitable distance. Preferably, however, the van body is hauled by truck to a suitable railroad flatcar 63 on which it may be mounted with its wheels removed for shipment over long distances in accordance with known practice; this practice of loading the van on and unloading it from the flatcar, and the means for making it possible, form no part of the invention.

The container 2 need not necessarily be supported by air bags only in a trailer van; it may be thus supported in a railroad car or other suitable conveyance. In FIGURE 9 two containers 2 are shown as supported by air bags in a railroad baggage car 64. The car may be a standard type having doors which completely open either or both ends; in the embodiment shown in FIGURE 9, the only modification which has been made to the car is the installation of sheeting material 65 at the top to provide surface area against which the top air bags 57 may bear. Each of the containers 2 is supported by bottom air bags 55, side air bags 56 and top air bags 57, and has mounted therein two articles to be shipped, all as described previously.

It is apparent that in each of the loading systems described above, the load represented by the container 2 carrying articles to be shipped, is fully supported by inflated air bags. The bottom air bags support the load vertically; together with the side bags and any top bags used, they also protect the load against vertically directed shocks including those from vibrations, by the cushioning action of the bottom and top bags, by the restraining action of the side bags on vertical load movements, and by the cooperative action of all bags in dampening the frequencies of vibratory or other shocks. The side bags also effectively protect the load against transversely directed shocks. The bottom, side and the top bags if used also act to protect the load against shocks directed longitudinally of the conveyance; as was indicated above, these shocks normally are by far the greatest to which the conveyance is subjected. Such protection is effected because the air bags permit the load to move in the direction of such shocks, which is the direction of travel of the conveyance, for a substantial distance against restraining forces provided by the bags; this involves work which dissipates the kinetic energy of, or imparts kinetic energy to, the load, and slows the rate of change of kinetic energy of the load. Since the bags frictionally engage surfaces of large areas of the container 2 and the conveyance, they cannot slip or slide appreciably if at all relatively to said surfaces while the bags undergo shear-type deformation during such load movement. Generally the load oscillates or reciprocates in directions parallel to the direction of the shock, usually to and from positions on each side of the normal position of the load at rest, and returns to the original position it occupied before such movement.

In the simplest but most frequently occurring shock-producing situation, in which the motion of the load changes from the velocity of the conveyance to a state of rest or vice-versa, the following equation applies:

$$(1) \quad Fd = \frac{mv^2}{2}$$

where "F" is the restraining force provided by the bags, "d" is the distance through which the load moves against the restraining force of the bags, "m" is the mass of the load and "v" is the velocity of the load. When the load is on a moving conveyance such as a railroad car striking a fixed object such as a string of loaded cars with a "stone wall" impact, the velocity "v" is that of the conveyance immediately before the impact; when the load is on a stationary conveyance such as a railroad car which is rapidly started, as by being struck by another car or jerked on starting of a train the velocity "v" is the ultimate velocity reached on such sudden starting. Often, the velocity "v" is a speed of from 4 to 8 miles per hour, but may reach 14 miles per hour.

Considered from another aspect, the loading system protects the load against shocks by greatly reducing the acceleration to which the load is subjected; this is accomplished because the longitudinal movement of the load due to air bag deformation increases the time during which the velocity of the load is changed. In the most frequently occurring shock-producing situation, during which the load is brought from a velocity to a state of rest or vice-versa, the following equation applies:

$$(2) \quad a = \frac{v}{t}$$

in which "v" is the velocity of the load, "t" is the time in which the load is brought from a velocity to a state of rest or vice-versa, and "a" is the acceleration to which the load is subjected, acceleration being the rate of change of velocity, whether the velocity is increasing or decreasing. It is obvious that the greater the time "t," the smaller is the acceleration "a."

The restraining force "F" required to perform the above indicated function of shock protection is dependent on the mass "m" of the load and the acceleration of the load as defined above, in accordance with the equation:

$$(3) \quad F = ma$$

Therefore, given load and the maximum acceleration "a" to which the load can be subjected without damage, it is possible to determine the required restraining force "F."

From Equation 1, the restraining force "F" can also be calculated:

$$(4) \quad F = \frac{mv^2}{2d}$$

where "m," "v" and "d" are defined as defined above. From Equations 3 and 4 above, the acceleration "a" can also be determined to be:

$$(5) \quad a = \frac{v^2}{2d}$$

The distance through which the load could move can be calculated from the following equations which are respectively based on Equations 4 and 5 above:

$$(6) \quad d = \frac{mv^2}{2F}$$

$$(7) \quad d = \frac{v^2}{2a}$$

By use of one or more of the equations set forth above, in appropriate units, it is possible to design a loading system embodying the invention; in general Equation 4 is the most helpful. The load is usually known, which establishes the mass "m"; the velocity "v" which will produce, or result from, the maximum shock to be guarded against is also usually known or can be readily established; the distance "d" through which the load is permitted to move against the restraining force provided by the bags, according to the present invention, should be between about 8″ to 30″ and preferably from about 15″ to 23″. These distances are the minimum clear distances which should be provided at the ends of the vehicle such as the van or rail car to permit longitudinal restrained movement of the load according to the invention. It has been found that when the distance "d" exceeds about 30″, the deformations of the bags are excessive and the bags may slip relatively to the load or conveyance; at distances below about 8″ the total resistance force to be provided by the bags becomes excessive. Optimum action in load restraint and shock absorption is obtained when the distance is between about 15″ to about 23″.

From either Equation 3 or 4 above, it is possible to determine the total restraining force "F" which the bags must provide in order to achieve the desired results for a given load, the distance "d," and velocity "v" or acceleration "a." By means of Equation 5 it is also possible to determine if the maximum acceleration to which the load can be subjected without damage will be exceeded, if it is the criterion of protection against shocks.

While various types of bags may be employed, it has been found advantageous to use commercially available air bags such as those previously described, ranging in size from approximately 22″ to 48″ in width, and from about 3′ to 9′ in length; in general the maximum distance "d" should be no more than about two thirds of the bag width. Preferably, each of the bags is in the general shape of a rectangle when uninflated, and of a thickness considerably less than, and preferably no more than a half of, its width when inflated and not under load; each bag is located with its width and its longest dimension transversely of the direction of travel, and preferably at right angles to such direction. The bags supporting the load from its bottom should be of such size and number that their total area contacting the load, multiplied by the pressure used in the bags, provides a total force sufficient to offset the weight of the load and the force provided by the top bags used, and to support the load clear of the floor of the conveyance while providing a bottom bag thickness within the range outlined below. The total area of these bags should be such that the bag pressure falls within the preferred range of from approximately 1 lb. to 5 lbs. per square inch; and preferably the pressure should be as low as possible within the range consistent with the provision of the necessary support and clearance of the load from the floor. Pressures of from about ½ lb. to 3 lbs. per square inch are preferably used in air bags, located at the sides or tops of the load or elsewhere, which primarily provide longitudinal restraining forces. In general, in loading systems of the type under consideration the thickness of the inflated air bag after it is mounted between the surface fixed to the load and the surface fixed to the conveyance should be between about 4 to about 12 inches; exceptional advantages in providing maximum holding power and satisfactory operation during the shear-type deformation are provided when the bags are between approximately 6 and approximately 10 inches in thickness when in place.

In general, according to the present invention, best results are obtained when each of the bags is of such type that when inflated as described above to a pressure of from about ½ to about 5 lbs. per square inch, it provides a restraining force of from about 500 to about 1800 pounds when deformed by displacement of its sides approximately 15″ transversely, and preferably substantially at right angles, to the thickness of the bag. The number of bags and their air pressures to be used may thus be readily determined from the total required restraining force "F," determined as described above.

The following example will demonstrate the effectiveness of the invention. Two vans were mounted on a railroad flat-car in the manner illustrated in FIGURE 7. The weight of the loaded car was approximately 161,000 pounds; one van had a gross loaded weight of approximately 47,000 pounds and the other van had a gross loaded weight of about 52,000 pounds. The latter, a 36' long van, carried a container 2 loaded as described above with two articles and having a total weight of about 46,000 pounds; the container had clearances from the van, and was supported by an air bag loading system, as described above in connection with FIGURES 1 to 8, inclusive. Impact recorder devices were mounted on the van that weighed 52,000 lbs. and on the articles being shipped which were supported in the container 2 in this van.

The loaded rail car was caused to strike three loaded gondola cars having a gross weight of approximately 140,000 pounds each; several tests were made with the loaded flatcar moving at speeds of approximately 4, 6 and 8.5 miles per hour immediately prior to impact. During the impacts the container 2 reciprocated back and forth on the air bags; during the higher impact speeds the maximum movement in one direction was nearly 30". The impact recorders showed much less shock on the articles being shipped than on the van; more specifically, at impact speeds of approximately 8.5 miles per hour, the impact recorder reading on the load was approximately 4/32" or 1 $g$ and on the van was approximately 34/32" or 8.5 $g$'s, indicating that the shock on the load was reduced by more than 85%.

Test runs of a railroad car carrying articles subject to damage by shocks and supported according to the present invention were made, some involving transcontinental trips. In such test runs the articles being shipped were subjected to shocks of extremely low magnitude as compared to the shocks to which the cars were subjected, and the articles and the container 2 carrying the articles were transported in undamaged condition. The tests in transit showed that the loading system embodying the invention reduced to less than 3/4 $g$ on the articles shocks of as high as 5 $g$'s imparted to the car by vibration, and reduced vibrational shock frequency to less than 3 cycles on the article from 30 to 100 cycles on the car. Other tests also showed that the articles could be loaded and unloaded readily.

From the above, it is apparent that the present invention provides a loading system and apparatus therefor which is simple of installation, inexpensive, and highly effective to protect loads against heavy shocks even exceeding those normally occurring in truck or rail transportation. While air bags have been described as the means for supporting the container and restraining it while permitting longitudinal movement, bags or similar enclosures filled with suitable fluids other than air may be employed. Although the invention has been described in connection with the transportation of articles to be shipped in containers supported by air bags in truck vans and railroad cars, it is obvious that such containers and loading systems embodying the invention may be employed in other types of vehicles. Loading systems employing inflated bags are disclosed and claimed in T. R. Fredriks Patent No. 3,067,699, issued December 11, 1962.

Furthermore, while various specific types of loading systems have been described in this embodiment, those skilled in the art will appreciate that the invention may be employed in loading systems and with containers other than those specifically disclosed herein, and that various changes and modifications other than those indicated above can be made in the invention without departing from the spirit and scope thereof. The essential characteristics of the invention are defined in the appended claims.

I claim:

1. A rigid, longitudinally extending shipping container, adapted to enclose and support from the sides thereof an article to be shipped, comprising a lower, rigid, longitudinally extending section which includes a bottom, a pair of upwardly extending side walls, and at the upper edges of said side walls a pair of parallel longitudinally extending members of substantial cross section each of which is adapted to reinforce the side wall on which it is mounted and act as a roller guide rail; a carrier, adapted to support an article to be shipped, comprising a transversely extending frame having at each side thereof a pair of longitudinally spaced rollers adapted to engage in guided rolling contact, and be supported by, the longitudinally extending member fixed to the top edge of the adjacent side wall of said lower section; an upper, rigid, longitudinally extending section which includes a top, a pair of downwardly extending side walls, and at the lower edges of said side walls a pair of longitudinally extending reinforcing members each adapted to reinforce the side walls on which it is mounted; and at each side of said container, a plurality of longitudinally extending spacer members each of which demountably rigidly engages, and spaces apart, said longitudinally extending reinforcing members at the longitudinal edges of said upper and lower sections, the ends of said spacer members at the sides of said container being spaced apart and serving to locate said rollers longitudinally of said container, and said spaced upper and lower longitudinally extending reinforcing members serving to locate said rollers vertically of said container, whereby an article to be shipped mounted in said carrier is supported and located in said container.

2. A rigid, longitudinally extending shipping container, adapted to enclose and support from the sides thereof an article to be shipped, comprising a lower, rigid, longitudinally extending section which includes a bottom wall having a substantially smooth bottom surface extending substantially throughout the length of said section, a pair of upwardly extending parallel side walls connected to said bottom wall and each having an outwardly facing substantially smooth surface extending substantially throughout the length of said section, and at the upper edges of said side walls a pair of parallel longitudinally extending members of substantial cross section each of which is adapted to reinforce the side wall on which it is mounted and act as a roller guide rail; a carrier, adapted to support an article to be shipped, comprising a transversely extending frame having at each side thereof a pair of longitudinally spaced rollers adapted to engage in rolling contact, and be supported by, the longitudinally extending member fixed to the top edge of the adjacent side wall of said lower section, each roller and the longitudinally extending member supporting it being adapted to prevent substantial relative transverse movement between said roller and said member; an upper rigid, longitudinally extending section which includes a top, a pair of downwardly extending side walls connected to said top and each having an outwardly facing substantially smooth surface extending substantially throughout the length of said section, and at the lower edges of said side walls a pair of longitudinally extending reinforcing members each adapted to reinforce the side wall on which it is mounted; and at each side of said container, a plurality of longitudinally extending spacer members each of which is demountably rigidly connected to, and spaces apart, said longitudinally extending reinforcing members at the longitudinal edges of said upper and lower sections and has a substantially smooth outwardly facing surface, the ends of said spacer members at the sides of said container being spaced apart and serving to locate said rollers longitudinally of said container, and said spaced upper and lower longitudinal reinforcing members serving to locate said rollers vertically and transversely of said container, whereby an article to be shipped mounted in said carrier is supported in said container and secured against substantial longitudinal, vertical and transverse movements relative to said container.

3. A rigid, longitudinally extending shipping container, adapted to enclose and support from the sides thereof an article to be shipped, comprising a lower, rigid, longitudinally extending section which includes a bottom, a pair of upwardly extending side walls, and at the upper edges of said side walls a pair of longitudinally extending members of substantial cross section each of which is adapted to reinforce the side wall on which it is mounted and to act as track means; a carrier adapted to support an article to be shipped, said carrier being movable longitudinally of said container and comprising a transversely extending frame having at each side thereof means adapted to engage, and be supported by, said track means so that said frame is capable of guided movement longitudinally of, but not substantially transversely of, said longitudinally extending members; an upper, rigid, longitudinally extending section which includes a top, a pair of downwardly extending side walls, and at the lower edges of said side walls a pair of longitudinally extending reinforcing members each adapted to reinforce the side wall on which it is mounted, said sections being formed independently of each other but being adapted to be demountably connected together at said reinforcing members of said side walls; and a plurality of spacer members which demountably rigidly engage and space apart said longitudinally extending reinforcing members of said upper and lower sections, there being a plurality of said spacer members spaced apart at each side of said container, said spacer members serving to locate said frame of said carrier longitudinally of said container, and said spaced upper and lower reinforcing members serving to locate said frame vertically of said container, whereby an article to be shipped mounted in said carrier is supported and located in said container.

References Cited in the file of this patent
UNITED STATES PATENTS

| | | |
|---|---|---|
| 2,161,402 | Arutunoff | June 6, 1939 |
| 2,483,269 | Fender | Sept. 27, 1949 |
| 2,613,836 | Newhall et al. | Oct. 14, 1952 |
| 2,620,079 | Rosenbaum | Dec. 2, 1952 |
| 2,630,236 | Arkoosh | Mar. 3, 1953 |
| 2,674,206 | Scott | Apr. 6, 1954 |
| 2,714,516 | Brown | Aug. 2, 1955 |
| 2,856,867 | Dasey | Oct. 21, 1958 |